(12) United States Patent
Palmer et al.

(10) Patent No.: US 10,989,828 B2
(45) Date of Patent: Apr. 27, 2021

(54) VIBRATION WHILE DRILLING ACQUISITION AND PROCESSING SYSTEM

(71) Applicant: Datacloud International, Inc., Seattle, WA (US)

(72) Inventors: Daniel Palmer, Santa Barbara, CA (US); James Rector, Oakland, CA (US)

(73) Assignee: DATACLOUD INTERNATIONAL, INC., Seattle, WA (US)

( * ) Notice: Subject to any disclaimer, the term of this patent is extended or adjusted under 35 U.S.C. 154(b) by 0 days.

(21) Appl. No.: 16/536,016

(22) Filed: Aug. 8, 2019

(65) Prior Publication Data
US 2019/0361139 A1    Nov. 28, 2019

Related U.S. Application Data

(63) Continuation-in-part of application No. 15/898,437, filed on Feb. 17, 2018, now abandoned.

(51) Int. Cl.
*G01V 1/00* (2006.01)
*G01V 1/28* (2006.01)
(Continued)

(52) U.S. Cl.
CPC ............ *G01V 1/50* (2013.01); *E21B 41/0085* (2013.01); *E21B 47/13* (2020.05); *E21B 49/003* (2013.01);
(Continued)

(58) Field of Classification Search
CPC .......... G01V 1/50; G01V 1/145; G01V 1/282; G01V 1/306; G01V 2210/1216; E21B 47/13; E21B 49/003; E21B 1/00
(Continued)

(56) References Cited

U.S. PATENT DOCUMENTS 4,926,391 A    5/1990   Rector et al.
5,592,438 A *   1/1997   Rorden .................. E21B 47/16
                                                            367/83
(Continued)

FOREIGN PATENT DOCUMENTS

EP         0336477 B1    11/1991
JP      2005210146    *   8/2005

OTHER PUBLICATIONS

International Search Report and Written Opinion, International Application No. PCT/US2019/018220 dated Jun. 3, 2019.
(Continued)

*Primary Examiner* — Michael P Nghiem
(74) *Attorney, Agent, or Firm* — Richard A. Fagin

(57) ABSTRACT

A vibration while drilling acquisition and signal processing system include a sensor assembly affixable to a drill string in a drilling unit and a sensor for detecting vibrations in the drill string. A first processor is in signal communication with the sensor and is programmed to digitally sample signals from the sensor. A transmitter in signal communication with the first processor communicates the digitized signals to a device disposed apart from the drill string. The first processor is programmed to operate the signal. An electric power source provides power to the sensor, the first processor and transmitter. Either or both the first processor and a second processor associated with the device is programmed to calculate properties of rock formations using only detected vibration signals from the drill string.

29 Claims, 8 Drawing Sheets

(51) Int. Cl.
*G01V 1/50* (2006.01)
*E21B 49/00* (2006.01)
*E21B 41/00* (2006.01)
*E21B 47/13* (2012.01)
*E21B 1/00* (2006.01)

(52) U.S. Cl.
CPC ........ *E21B 1/00* (2013.01); *G01V 2210/1216* (2013.01)

(58) Field of Classification Search
USPC .......................................................... 702/14
See application file for complete search history.

(56) References Cited

U.S. PATENT DOCUMENTS

| | | | |
|---|---|---|---|
| 7,911,760 | B2 | 3/2011 | Lownds |
| 8,416,418 | B2 | 4/2013 | Kendall |
| 8,538,698 | B2 | 9/2013 | Heck |
| 8,649,980 | B2 | 2/2014 | Gulati |
| 9,618,310 | B2 | 4/2017 | Brent et al. |
| 10,697,294 | B2 * | 6/2020 | Palmer ...................... G01V 1/50 |
| 2002/0195276 | A1 | 12/2002 | Dubinsky et al. |
| 2004/0216872 | A1 | 11/2004 | Foster et al. |
| 2005/0024231 | A1 | 2/2005 | Fincher et al. |
| 2005/0065730 | A1* | 3/2005 | Sinha ...................... G01V 1/50 702/7 |
| 2005/0171700 | A1 | 8/2005 | Dean |
| 2006/0023105 | A1 | 2/2006 | Kostrzewski |
| 2006/0262480 | A1 | 11/2006 | Stewart |
| 2007/0081091 | A1 | 4/2007 | Pan |
| 2009/0289808 | A1 | 11/2009 | Prammer |
| 2010/0020550 | A1* | 1/2010 | Kawashima ........ F21V 23/0435 362/362 |
| 2010/0033552 | A1 | 2/2010 | Ogawa |
| 2011/0149684 | A1* | 6/2011 | Hurst ...................... G01V 1/46 367/34 |
| 2012/0139325 | A1 | 6/2012 | Norberg et al. |
| 2012/0169841 | A1 | 7/2012 | Chemali |
| 2012/0211649 | A1 | 8/2012 | Hallundbaeck |
| 2012/0222901 | A1 | 9/2012 | Pei |
| 2012/0323495 | A1 | 12/2012 | Zhou |
| 2013/0073206 | A1 | 3/2013 | Hou et al. |
| 2013/0080060 | A1* | 3/2013 | Yang ........................ G01V 1/50 702/9 |
| 2013/0118249 | A1* | 5/2013 | Conn ...................... E21B 47/18 73/152.21 |
| 2013/0192850 | A1 | 8/2013 | Craik |
| 2013/0204202 | A1* | 8/2013 | Trombly ............... A61M 5/172 604/207 |
| 2013/0318019 | A1 | 11/2013 | Jamison et al. |
| 2014/0083765 | A1 | 3/2014 | Hoult et al. |
| 2014/0119159 | A1 | 5/2014 | Calvez et al. |
| 2014/0136170 | A1 | 5/2014 | Leahy et al. |
| 2014/0343754 | A1 | 11/2014 | Poettker et al. |
| 2015/0006444 | A1 | 1/2015 | Tamatsu et al. |
| 2015/0052092 | A1 | 2/2015 | Tang et al. |
| 2015/0071033 | A1 | 3/2015 | Thompson et al. |
| 2015/0381981 | A1 | 12/2015 | Gelman |
| 2016/0042272 | A1 | 2/2016 | Mohaghegh |
| 2016/0069655 | A1 | 3/2016 | Brent |
| 2016/0119159 | A1 | 4/2016 | Zhao |
| 2016/0209195 | A1 | 7/2016 | Kruger et al. |
| 2016/0299091 | A1 | 10/2016 | Bamber et al. |
| 2016/0313107 | A1 | 10/2016 | Birkin |
| 2017/0028443 | A1 | 2/2017 | Bamber et al. |
| 2017/0038188 | A1 | 2/2017 | Handel |
| 2017/0102452 | A1* | 4/2017 | Lilburn ................ G01S 13/284 |
| 2017/0124711 | A1 | 5/2017 | Chandraker et al. |
| 2017/0146452 | A1 | 5/2017 | Ben-Dor et al. |
| 2019/0257197 | A1* | 8/2019 | Palmer ................... E21B 47/13 |
| 2019/0257964 | A1* | 8/2019 | Palmer ................... G01V 1/282 |
| 2019/0257972 | A1* | 8/2019 | Palmer ..................... G01V 1/42 |

OTHER PUBLICATIONS

S.G. Walters, Driving Productivity by Increasing Feed Quality Through Application of Innovative Grade Engineering Technologies, 2016.

Segui, J.B., et al. "Blast Design Using Measurment While Drilling Parameters", Fragblast, 6:3-4, 287-299 (2010).

Poletto, P., et al., "Numerical Modeling and Interpretation of Drillstring Waves", Geophysics, vol. 66, No. 5, pp. 1569-1581 (Sep.-Oct. 2001).

Luts, J. et al, Instantaneous Logging Based on a Dynamic Theory of Drilling, Journal of Petroleum Technology, Jun. 1972.

* cited by examiner

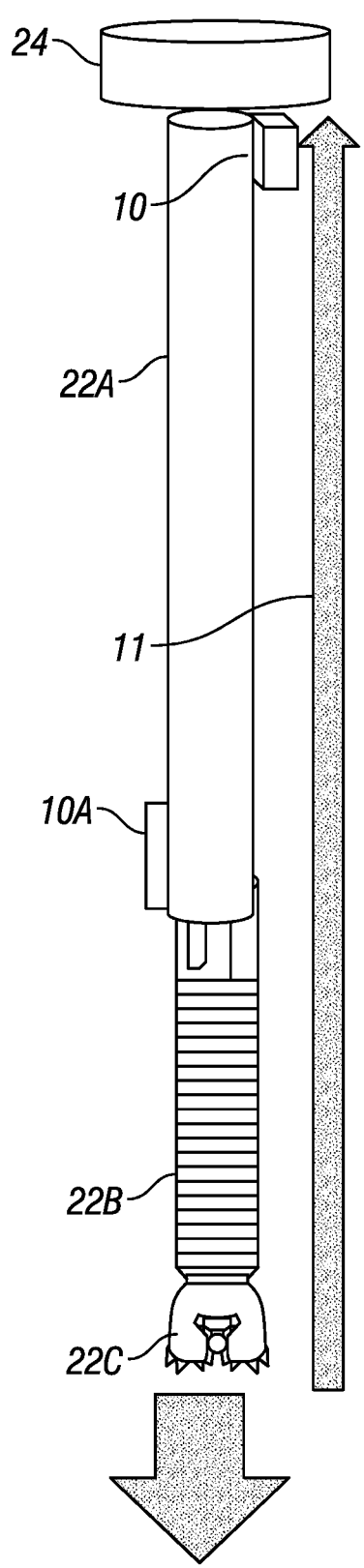
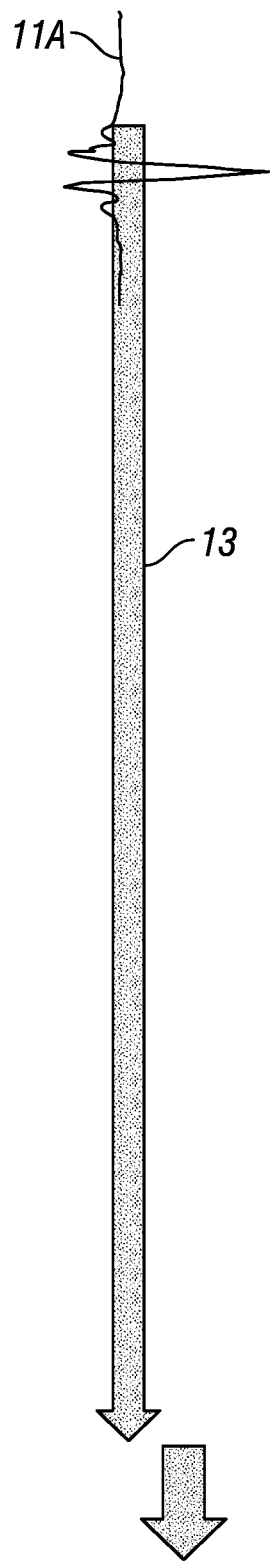
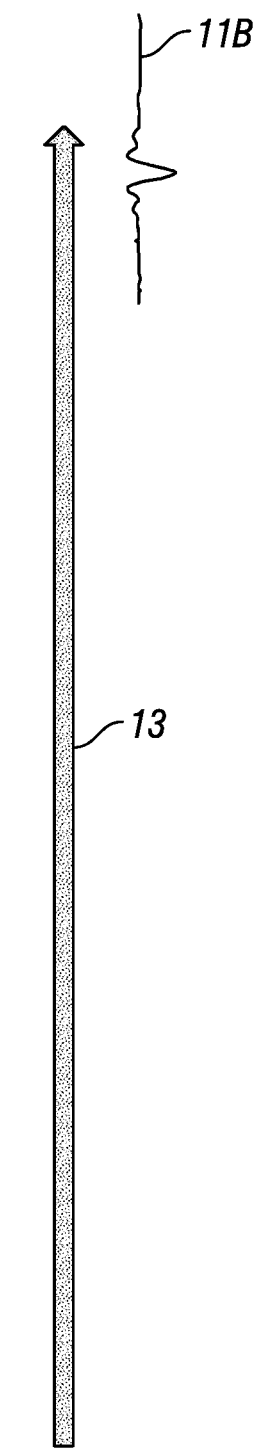
FIG. 2  FIG. 3  FIG. 4

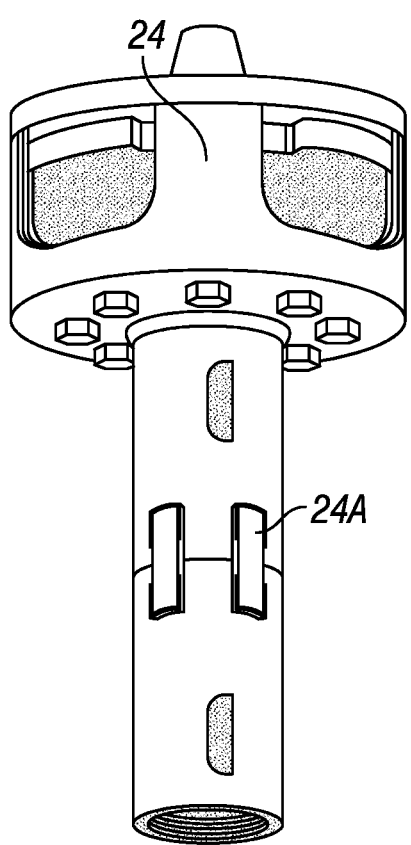 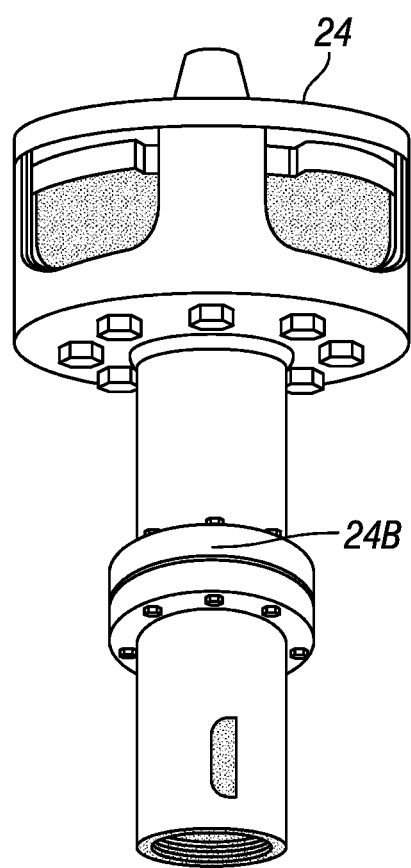
*FIG. 6A*  *FIG. 6B*

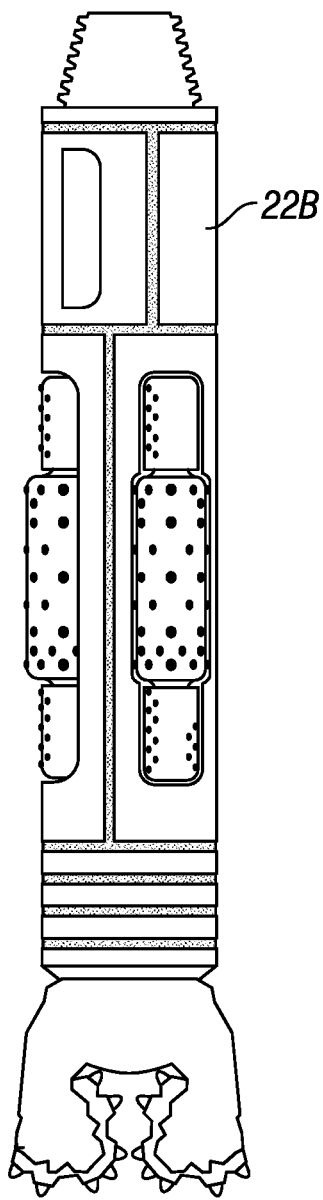 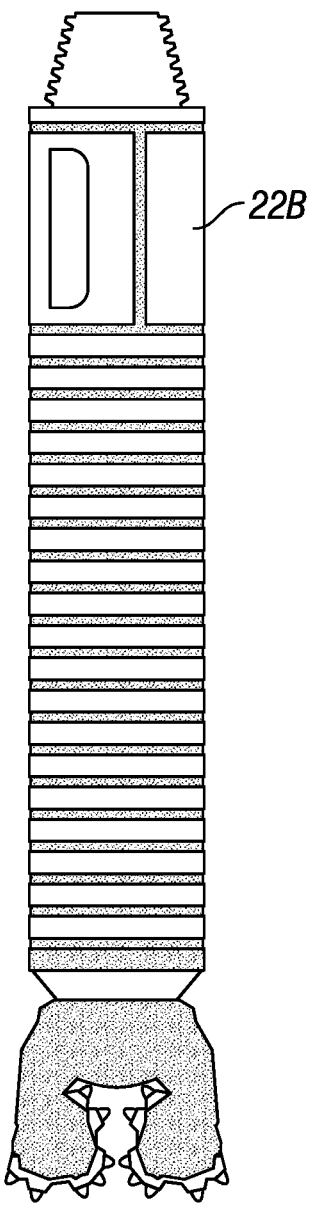
FIG. 6C                    FIG. 6D

VIBRATION WHILE DRILLING ACQUISITION AND PROCESSING SYSTEM

CROSS REFERENCE TO RELATED APPLICATIONS

Continuation in part of U.S. application Ser. No. 15/898,437 filed on Feb. 17, 2018 and incorporated herein by reference in its entirety.

STATEMENT REGARDING FEDERALLY SPONSORED RESEARCH OR DEVELOPMENT

Not Applicable

NAMES OF THE PARTIES TO A JOINT RESEARCH AGREEMENT

Not Applicable.

BACKGROUND

This disclosure relates generally to the field of seismic surveying while wellbore drilling using a drill bit as a seismic energy source. More specifically, the disclosure relates to apparatus and methods for acquiring drilling vibration data created by drill bit interactions with the formation being drilled using sensors attached to the drill string and/or sensors attached to the earth, and processing the acquired data to obtain properties of rock formations using seismic signals generated by interaction of a drill bit with rock formations.

Obtaining drilling vibration signals generated by interaction of a drill bit with rock formations during drilling of such formations is known in the art for the purpose of obtaining certain seismic properties of the rock formations. A method and apparatus for obtaining such signals and processing the signals to obtain seismic properties are described In U.S. Pat. No. 4,926,391 issued to Rector et al. A generalized description of an apparatus disclosed in such patent is as follows. The apparatus includes a drilling rig and a rotary drill bit attached to the drilling rig for providing seismic waves as the drills in the earth. There is at least one seismic wave sensor spaced from the rotary drill bit in the earth for receiving signals traveling via direct seismic wave paths and signals traveling via seismic wave paths reflected by the subterranean geologic formation from the seismic waves provided by the drill bit. At least one reference sensor is located on or proximate to the drilling rig. A means is connected to receive the reference signal from the reference sensor and the drill bit generated signals from the at least one seismic wave sensor to distinguish the drill bit generated signals from interference signals by cross-correlating the reference and seismic wave sensor signals. The apparatus has a means connected to receive the reference signals either prior to or subsequent to their cross correlation for reference deconvolution or whitening. A means is connected to receive the cross-correlated reference and seismic wave sensor signals for eliminating rig generated energy from the reference signals. A means is connected to receive the cross correlated reference and seismic wave sensor signals from the rig generated energy eliminating means for separating the seismic wave sensor signals into a first group of the seismic wave sensor signals representing the drill bit generated seismic waves received by the at least one seismic wave sensor in the direct seismic wave paths, and a second group of the seismic wave sensor signals representing the drill bit generated seismic waves received by the at least one seismic wave sensor in the seismic wave paths reflected by the subterranean geologic formation.

One seismic property of rock formations that is not provided by seismic while drilling apparatus methods and apparatus known in the art is local mechanical properties of the of the rock formations being drilled such as acoustic impedance. It is desirable to obtain such properties during drilling for wells used, as a non-limiting example, for blast holes drilled as part of construction of mining procedures. Having information about rock formation properties such as acoustic impedance may assist in choosing appropriate blasting parameter (e.g., weight of, placement of and type of explosive).

SUMMARY

A vibration while drilling acquisition and signal processing system according to one aspect of this disclosure includes at least one sensor assembly affixable to a rotating part of a drill string in a drilling unit, each such sensor assembly comprises at least one sensor for detecting vibrations in the drill string. A first processor is in signal communication with the at least one sensor and programmed to digitally sample signals from the sensor. A transmitter is in signal communication with the first processor to communicate digitized signals to a device disposed apart from the drill string, the first processor programmed to operate the transmitter. An electric power source provides power to the sensor, the first processor and the transmitter. At least one of the first processor and a second processor associated with the device is programmed to calculate properties of rock formations using only detected vibration signals from the drill string.

In some embodiments, the first processor is programmed to compress the digitized signals.

In some embodiments, the first processor is programmed to perform autocorrelation to compress the digitized signals.

In some embodiments, the first processor is programmed to operate the transmitter intermittently during operation of the sensor assembly.

In some embodiments, the sensor assembly is disposed in a housing affixed to the drill string using at least one permanent magnet.

In some embodiments, the at least one sensor comprises one or more of an accelerometer, a multi-axial accelerometer and a microelectrical mechanical accelerometer.

In some embodiments, the electric power source comprises a battery.

Some embodiments further comprise an energy conversion device electrically connected to the electric power source, the energy conversion unit converting at least one of vibrational energy and electromagnetic energy to electrical power.

In some embodiments, the properties comprise compressional modulus or compressional velocity.

Some embodiments further comprise a data storage device in signal communication with the first processor to store digitized signals in the sensor assembly during drilling and for later interrogation and processing.

In some embodiments, the affixing of the sensor assembly to the drill string is configured to provide substantially resonance free mounting to at least 200 hertz and the signal sampling rate is at or above 1 Kilohertz.

Some embodiments further comprise an acoustic reflector in the drill string.

A method for acquiring drill string vibration data during drilling according to another aspect of this disclosure comprises detecting vibrations along a rotating part of a drill string while drilling a borehole. Signals corresponding to the detected vibrations in a device mounted to the drill string are digitized. The digitized signals are transmitted to a location apart from the drill string. Properties of rock formations are calculated for, (i) at the location using only the digitized signals, and (ii) in the device mounted on the drill string using only the digitized signals.

Some embodiments further comprising storing the digitized signals in the device mounted on the drill string and subsequently interrogating and processing the stored, digitized signals.

In some embodiments, the properties comprise compressional modulus.

Some embodiments further comprise compressing the digitized signals.

Some embodiments further comprise operating the transmitter intermittently and transmitting the compressed, digitized signals using the intermittently operated transmitter.

In some embodiments, wherein the transmitting is performed intermittently when drilling has stopped.

Some embodiments further comprise converting vibrations in the drill string into electrical power to enable the digitizing and transmitting.

A vibration while drilling acquisition and signal processing system according to another aspect of this disclosure comprises at least one sensor assembly affixable to a rotating part of a drill string in a drilling unit. The at least on sensor assembly comprises at least one sensor for detecting vibrations in the drill string. A transmitter is in signal communication with the at least one sensor to communicate vibration signals to a device disposed apart from the drill string. An electric power source provides power to the at least one sensor and the transmitter. A receiver and a processor are disposed at the location for receiving the signal from the device, wherein the processor is programmed to calculate properties of rock formations only detected vibration signals from the drill string.

In some embodiments, the at least one sensor comprises a piezoelectric or piezo resistive sensor.

In some embodiments, the electric power source comprises a battery.

Some embodiments further comprise an energy conversion device electrically connected to the electric power source, the energy conversion unit converting at least one of vibrational energy and radio frequency energy to electrical power.

In some embodiments, the properties include compressional modulus.

Some embodiments further comprise an acoustic reflector in the drill string.

A vibration while drilling acquisition and signal processing system according to another aspect of this disclosure comprises at least one sensor assembly adjacent to a rotating part of a drill string in a drilling unit, each such sensor assembly comprises at least one sensor for remotely sensing vibrations in the drill string. A first processor is in signal communication with the at least one sensor and programmed to digitally sample signals from the sensor. At least one of the first processor and a second processor is associated with the system and is programmed to calculate properties of rock formations using only detected vibration signals from the drill string.

In some embodiments, the sensor senses magnetic field to measure axial displacement or velocity In some embodiments, the sensor utilizes electromagnetic induction to measure axial displacement or velocity In some embodiments, the sensor utilizes a capacitive measurement of axial displacement or velocity.

Some embodiments further comprise an acoustic reflector in the drill string.

BRIEF DESCRIPTION OF THE DRAWINGS

FIG. 2 shows a drilling tool assembly (drill string) and the sensor assembly shown in FIG. 1 in more detail.

FIG. 3 shows a representation of vibration signals from the sensor assembly corresponding to from drill bit/formation interactions after propagation up the drill string and after a first level of processing in the data processing unit.

FIG. 4 shows a representation of vibration signals as in FIG. 3 but wherein the propagating vibrations from the drill bit have passed the sensor assembly and have been reflected from the shock absorber in FIG. 2 have traveled down past the sensor assembly to the bottom of the bit and have been reflected at least once again from the bottom of the drill string and have from thence propagated up the drill string and detected in the sensor assembly.

FIGS. 6A and 6B show respective example embodiments of a shock absorber disposed between a drive unit on the drilling unit and a top end of the drill string.

FIGS. 6C and 6D show, respectively, various embodiments of a bottom hole assembly (BHA) that may be used to connect the drill bit to a lower end of a drive rod or drill pipe.

DETAILED DESCRIPTION

Figure 1:
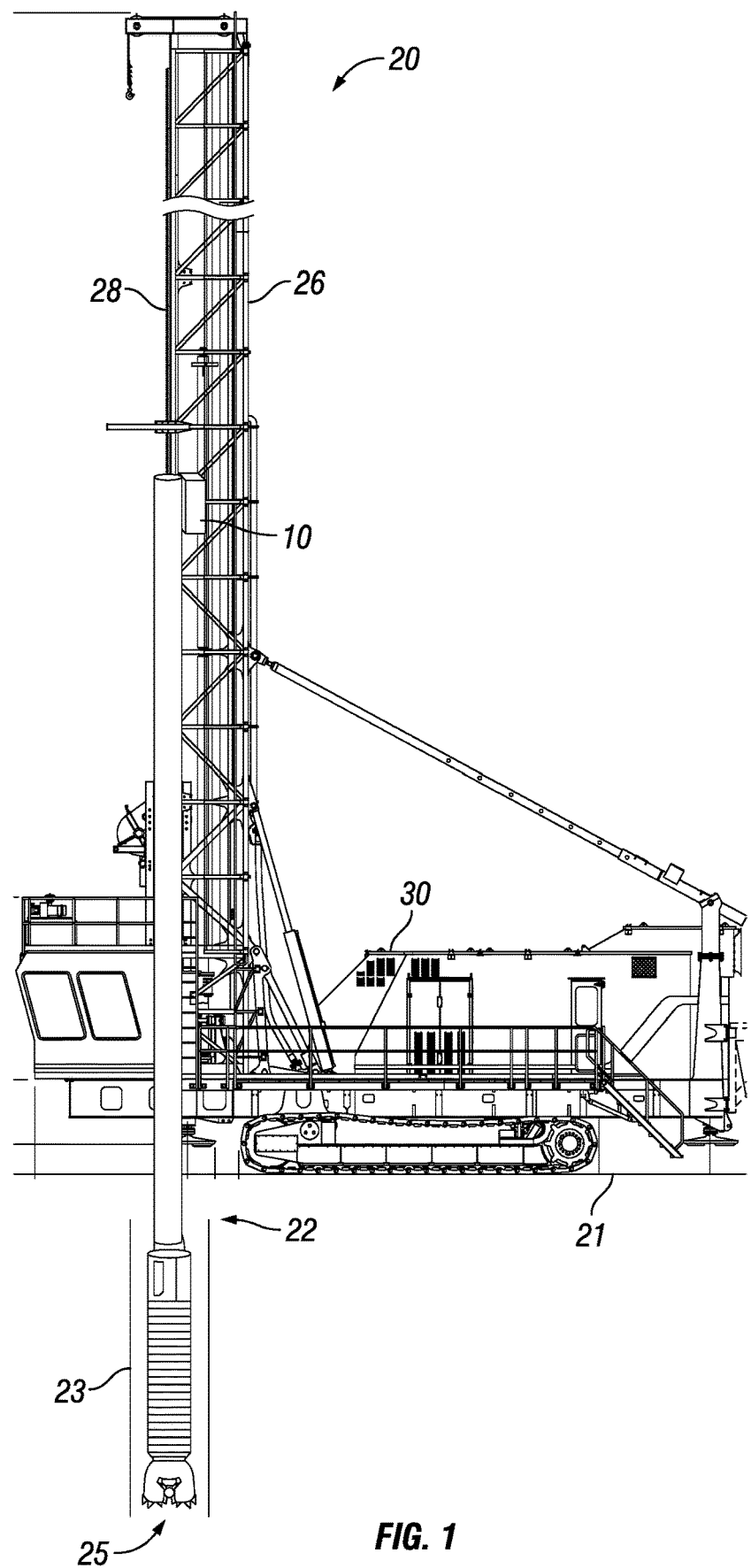
FIG. 1 shows an example embodiment of a drilling unit having a sensor assembly and data processing unit according to the present disclosure.

FIG. 1 shows an example embodiment of a vibration while drilling system used in connection with a wellbore drilling unit. The wellbore drilling unit 20 in FIG. 1 performs rotary drilling, and may be for example, a blast hole drilling unit, a shaft drilling unit of a test hole boring unit used connection with mining or construction operations or a fluid extraction well drilling unit, e.g., an oil and gas well drilling unit. The wellbore drilling unit 20 may comprise a vehicle mounted mast 26 disposed on a road vehicle or an off road, tracked vehicle 30. The mast 26 may be lowered into a horizontal position on the vehicle 30 for transporting the drilling unit 20 to selected drilling positions. A drilling tool assembly (or "drill string") 22 may be suspended from a hoisted drive unit 28 engaged with the mast 26. The drive unit 28 may provide rotational and/or hydraulic or pneumatic energy to operate the drill string 22 to rotate a drill bit (see 22C in FIG. 2) at one end of the drill string 22. In FIG. 1, the drill string 22 is shown drilling a borehole or wellbore 23 through rock formations 22 disposed beneath the ground surface 21. In the example embodiment shown in FIG. 1, the drive unit 28 rotates the drill string 22, and weight of the drill string 22 is partially transferred to the drill bit (see FIG. 2) to urge the drill bit into contact with the rock formations 25 to cut through the rock formations 25, thus extend the borehole 23. Drill cuttings may be removed from the borehole by pumping compressed air or drilling liquid through the drill string 22 an out through nozzles or courses in the drill bit, subsequently moving through an annular space between the wall of the borehole 23 and the exterior of the drill string to move the drill cuttings out of the borehole 23. The drill rig may drill using as a rotary drive, and/or using a "Down hole hammer" (DTH) or top hammer system.

Components of a vibration while drilling data acquisition and processing system are shown schematically in FIG. 1 as a sensor assembly 10 and a data processing unit 40. The sensor assembly 10 may be mounted at a selected position, in some embodiments proximate the top of the drill string 22, and may include internal components, to be explained in more detail below, to detect axial vibrations in the drill string 22 and to communicate signals related to the detected axial vibrations to the data processing unit 40. In the present example embodiment, the sensor assembly may convey such signals using wireless telemetry (explained in more detail below), for which the data processing unit may comprise a corresponding wireless telemetry system (shown schematically by antenna 41).

FIG. 2 shows the drill string 22 in more detail. The drill string 22 may comprise drill pipe 22A, which may be comprise of threaded connected segments (joints) of drill pipe coupled at one end to a bottom hole assembly (BHA) 22B. The BHA 22B may comprise tools such as stabilizers, roller guides, heavy weight drill pipe, drill collars or other drilling tools known in the art. The drill bit 22C may be coupled to the bottom end of the BHA 22B, the top of which may be connected to the drill pipe 22A. The drill string 22 may comprise a shock absorber or isolator 24 disposed at the upper end of the drill pipe 22A between the drive unit (28 in FIG. 1) and the upper end of the drill string 22. In the present example embodiment, the sensor assembly 10 may be coupled to the drill pipe 22A proximate the shock absorber 24.

The drill bit 22C may be a roller cone drill bit of types well known in the art for borehole drilling having one or more cones rotatably mounted to a bit body such that rotation of the bit body causes corresponding rotation of the one or more cones. The cones may comprise a plurality of cutting elements such as integrally formed or affixed teeth, or inserts made from hard material such as tungsten carbide or carbide coated steel. As the cutting elements are urged into contact with the rock formations (25 in FIG. 1), the cutting elements may crush the formations such that the rock fails. Some fraction of the input energy is also converted into head and vibration energy The foregoing interaction between the drill bit 22C and the rock formations (25 in FIG. 1) induces vibrations, particularly axial vibrations at the drill bit/rock interface that propagate away from this interface up the drill string 22 and into to the rock formations. The characteristics of these vibration signals may be related to the input drilling characteristics, the bottom hole geometry, the rock formation properties, and the drill string properties Fractional amounts of the axial vibrations that remain in the drill bit 22C propagate upwardly through the drill string 22 until they reach the sensor assembly 10, as shown by the arrow 11 in FIG. 2.

Referring to FIG. 3, on reaching the shock absorber or another device or change in mechanical properties that cause a change in the acoustic impedance contrast in the drill string (22 in FIG. 2), the vibrations are reflected and travel downwardly through the drill string as shown by arrow 13 until they reach the bottom of the drill string. A waveform 11A represents a signature of the vibrations propagating upwardly from the drill bit through the drill string and detected by the sensor assembly (10 in FIG. 2). Referring to FIG. 4, on reaching the bottom of the drill string, the reflected vibrations are again reflected so as to travel upwardly along the drill string, indicated by arrow 15, and are again detected by the sensor assembly. A waveform 11B represents a signature of the twice reflected axial vibrations detected by the sensor assembly (10 in FIG. 2).

Figure 5:
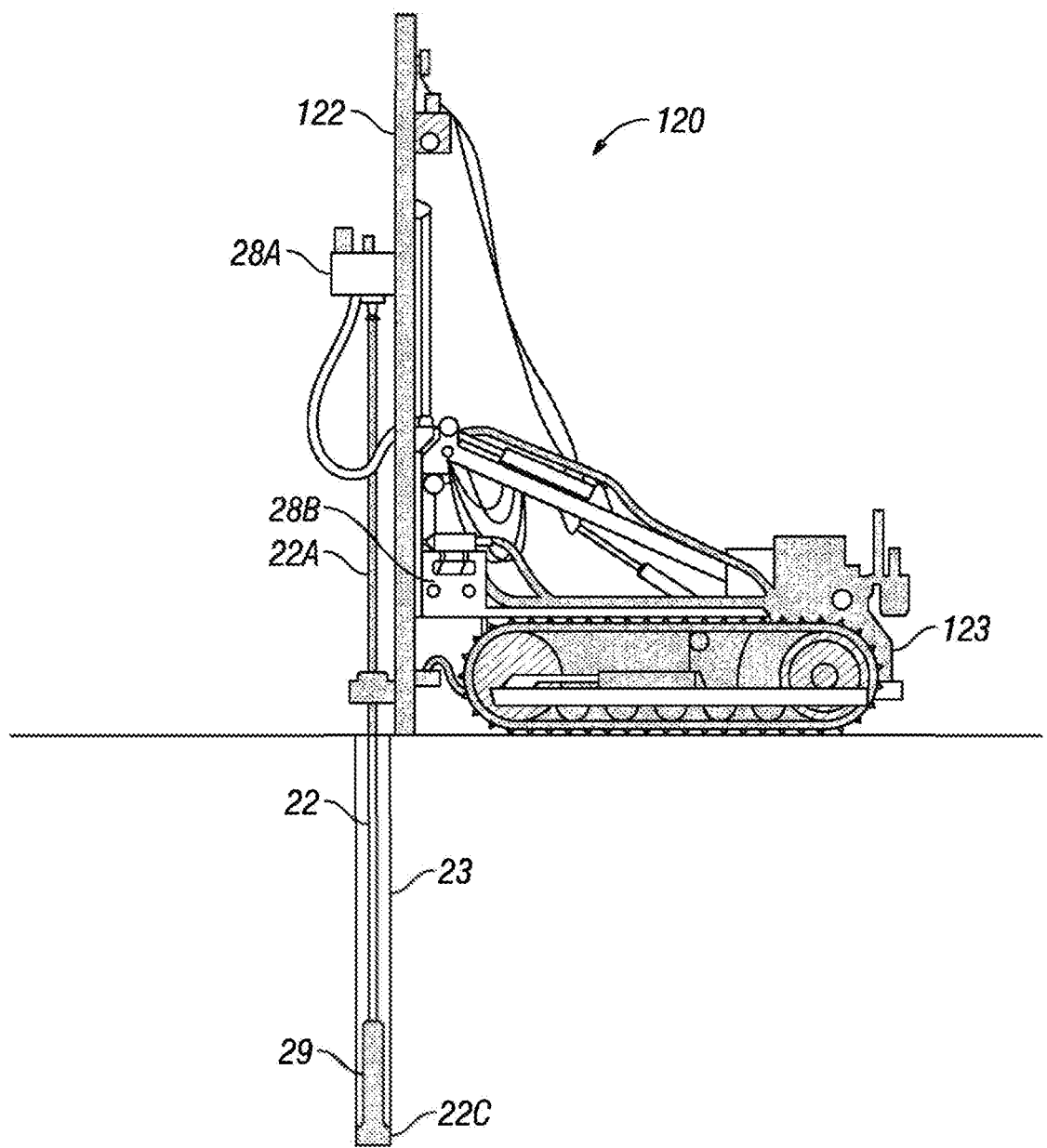
FIG. 5 shows another example embodiment of a drilling unit.

FIG. 5 shows another example embodiment of a drilling unit 120 that may be used with a system according to the present disclosure. The drilling unit 120 may be of a type that performs percussion (hammer) drilling. A mast 122 having a rotation motor or drive unit 28A and a feed motor 28B to rotate and axially displace, respectively, a drive rod or tube 22A may be mounted to a vehicle 123. In the present embodiment, rotation of the drive rod or tube 22A may cause operation of a drill hammer 29 at the lower end of the drive rod or tube 22A. Percussion generated by the drill hammer 29 is transferred to a hammer bit 22C of types known in the art for borehole drilling using drilling hammers. The action of the drill hammer 29 and the hammer bit 22C serves to elongate the borehole 23. Interaction between the hammer bit 22C and the rock formations induces vibrations in the drive rod or tube 22A. Such vibrations may be detected by a sensor assembly 10 as explained with reference to FIGS. 2, 3 and 4. Signals generated in the sensor assembly 10 may be communicated to a data processing unit 40 substantially as explained with reference to FIG. 1.

Various embodiments of the shock absorber 24 are shown in FIGS. 6A and 6B. In FIG. 6A, a rotary output end of the shock absorber may be affixed to a crossover sub or adapter to connect to the top of the drill string (22 in FIG. 1) by welded on straps 24A. In FIG. 6B, rotary connection to the crossover sub may be made using a profile torque transmitting element, for example and without limitation a square or hex drive 24B.

FIG. 6C shows one embodiment of the BHA 22B which may comprise a roller stabilizer. Another embodiment of the BHA 22B, shown in FIG. 6D may comprise a bit sub.

In embodiments used in connection with hydrocarbon extraction well the system may comprise one or more of the following features. The sensor (see 52 in FIG. 8) may be a high frequency (e.g., minimum upper limit of detectable acceleration frequency of at least 5 kHz) accelerometer coupled to the drill string at or close to a reflecting element. A reflecting element may comprise a change in cross section of the components of the drill string and/or acoustic impedance of adjacent components of the drill string to cause a reflection of drill induced vibrations back to the drill bit at or above a certain frequency. The foregoing may take advantage of the change in drill string component diameter in a near bit stabilizer, an hydraulic drilling motor, a rotary steerable directional drilling system, a drill bit shock sub or other BHA components. Reflecting some of the drill bit vibration energy back to the bit to enhance measurement of the rock formation impedance while drilling. The distance from the drill bit to the reflecting element implemented as described above may be optimized to maximize signal to noise ratio. A "short hop" radio frequency or electromagnetic signal link between the sensor assembly and a logging-while-drilling (LWD) and/or measurement-while-drilling (MWD) system may be included in some embodiments. In some embodiments, a processor may be provided in the sensor assembly or in an MWD/LWD system configured to calculate rock formation acoustic impedance or other rock formation properties during drilling, and to communicate such calculated properties to the MWD/LWD system for storage and communication in real time, or to communicate the calculated rock formation parameters to another location for use.

Figure 7:
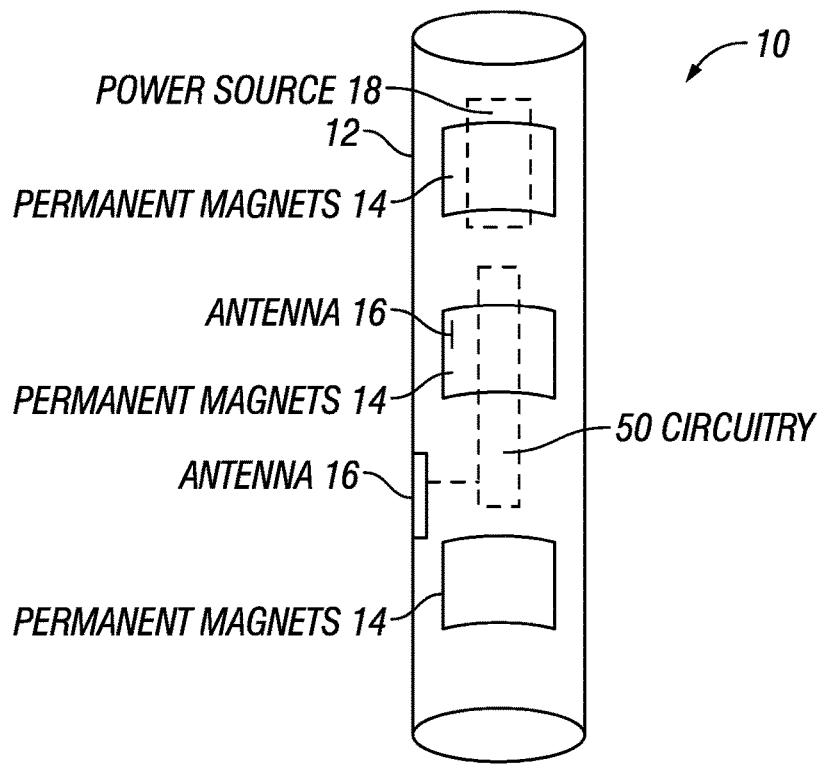
FIG. 7 shows an example embodiment of a sensor assembly.

FIG. 7 shows an example embodiment of a sensor assembly 10 according to the present disclosure. Circuitry 50 having components therein to perform vibration detection and detected vibration signal processing may be disposed in a weather tight housing 12. The housing 12 may be configured to mount on the drill string (22 in FIG. 1) in such places as shown in FIG. 1 and FIG. 2. In the present example embodiment, the housing 12 may be secured to the drill string (22 in FIG. 1) using permanent magnets 14 affixed to the housing 12. The permanent magnets 14 may be made from neodymium-iron-boron magnetic material such as may be obtained, for example, from Dexter Magnetic Technologies, Inc., Elk Grove Park, Ill. The circuitry 50 may be provided with electrical power from a self-contained power source 18 such as one or more batteries. Signals produced by the circuitry 50 to be communicated to the data processing unit (40) may be communicated by radio signal (explained in more detail with reference to FIG. 8), and for which an antenna 16 may be provided. The antenna 16 may be implemented, for example as a wire loop or coil disposed in a recess in the exterior of the housing in which the loop or coil may be embedded in an electrically non-conductive, non-magnetic material. Having a self-contained power source 18 and radio communication may provide that the sensor assembly 10 can detect vibrations in the drill string (22 in FIG. 1) and communicate such signals and/or processed derivatives of such signals to the data processing unit (40 in FIG. 1) conveniently without the need for a wired connection.

Figure 8:
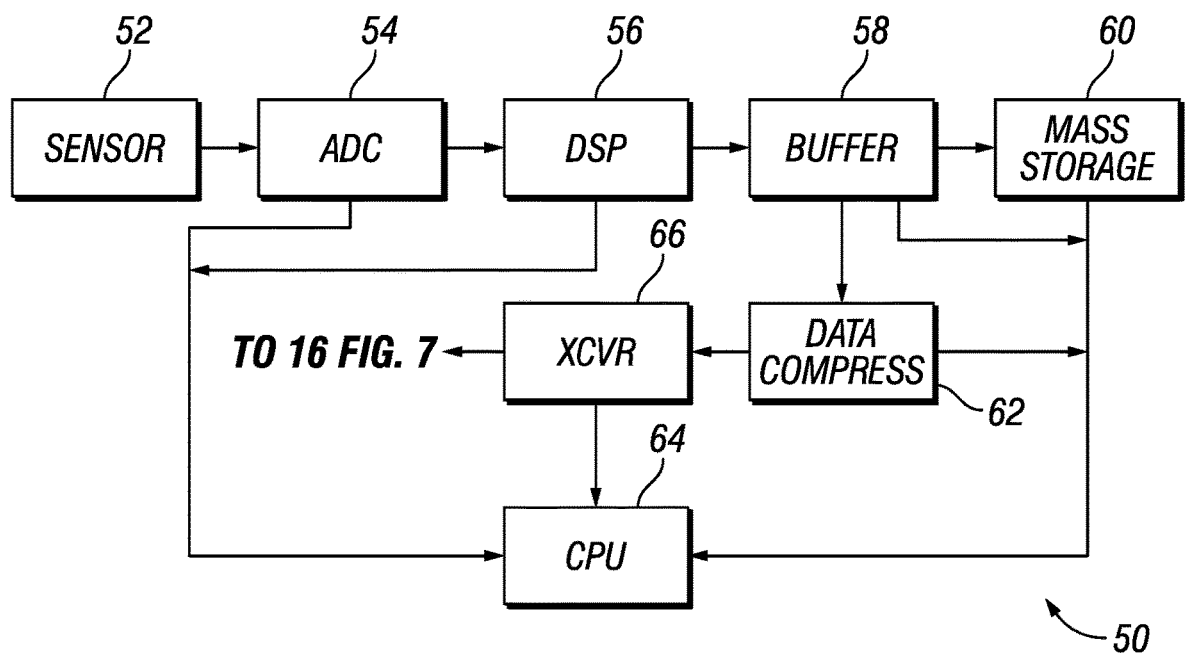
FIG. 8 shows functional components of the sensor assembly in FIG. 7.

FIG. 8 shows an example embodiment of the circuitry 50 in the sensor assembly (10 in FIG. 7). Components of the circuitry 50 may be affixed to one or more printed circuit boards, which boards may be affixed to the interior of the housing (12 in FIG. 1).

A sensor 52 may be of a type that can detect axial vibrations in the drill string (22 in FIG. 1). Non-limiting examples of such sensor 52 include piezoelectric or piezo resistive sensors such as accelerometers, strain gauges, velocity sensors and air pressure sensors that can be used to calculate the vertical displacement and movement of the drill string (22 in FIG. 1). In some embodiments, the sensor 52 may be a single component or multicomponent piezoelectric accelerometer. In some embodiments, an accelerometer may be a microelectromechanical system (MEMS) accelerometer, having one or more measurement component directions. In some embodiments the sensor 52 is mounted to the housing (12 in FIG. 7) to efficiently transmit vibrations induced in the housing (12 in FIG. 7) by the drill string (22 in FIG. 1) to the sensor 52. Characteristics of the sensor 52 that may be used in some embodiments include one or more of the following: Attaching the housing (12 in FIG. 7) using permanent magnets as shown may maintain resonance free frequency response of the sensor 52 to at least 5 kHz. The sensor 52 may have an upper limit of frequency response to at least 1 kHz. In some embodiments the upper limit may be at least 5 kHz. Maximum acceleration applicable to the sensor 52 for embodiments of the sensor assembly 10 used in rotary drilling units such as shown in FIG. 1 may be approximately 20 g. For hammer drilling as shown in FIG. 5 a maximum acceleration may be approximately 200 g. If the sensor 52 is an accelerometer, using a piezoelectric sensing element may minimize the noise floor. A non-limiting example of an accelerometer that may be used as the sensor in some embodiments is a triaxial, circuit board mounted device sold by TE Connectivity. A possible advantage of using a triaxial accelerometer if an accelerometer is used as the sensor 52 is to enable using measurements of acceleration orthogonal (normal) to the longitudinal dimension of the drill string (22 in FIG. 1) to enable adjusting longitudinal vibration measurements for effects of cross-component coupling.

Signals generated by the sensor 52 may be conducted to an analog to digital converter (ADC) 54. Digitized signals from the ADC 54 may be conducted to a digital signal processor (DSP) 56. The DSP 56 may perform processes on the digitized signals from the ADC 54, for example and without limitation, filtering and correlation. Signals processed in the DSP 56 representing selected length time windows may be stored in a buffer 58. Signals in the buffer 58 may be communicated to a mass storage device 60 such as a solid state memory. In such embodiments, the signals in the mass storage device 60 may be interrogated and processed, for example and without limitation in the data processing unit (40 in FIG. 1) during a pause in drilling operations and/or after drilling operations are completed. Signals in the buffer 58 may also be communicated to a data compression device 62. Compressed data from the data compression device 62 may be communicated to a signal transmitter, which may be part of a transceiver 66. The transceiver 66 may be, for example and without limitation a device configured to communicate with a corresponding transceiver (see FIG. 9) in the data processing unit (40 in FIG. 9). The transceiver 66 may be configured to implement wireless communication protocols such as, for example and without limitation Institute of Electrical and Electronics Engineers standards 802.11(a), (b), (g), (n) and/or (ac) or BLUETOOTH protocol. BLUETOOTH is a registered trademark of Bluetooth Special Interest Group, Inc., 5209 Lake Washington Boulevard NE Suite 350 Kirkland, Wash. 98033.

Operation of the ADC 54, DSP, 65, buffer 58, mass storage device 60, data compression device 62 and transceiver 66 may be controlled by a first central processor 64. In some embodiments, the first central processor 64 may operate the transceiver 66 intermittently based on the degree of data compression performed by the data compression device 62 so as to limit the amount of time the transceiver 66 operates. By limiting the transceiver operating time based on data compression, power from the power source (18 in FIG. 7) may be conserved.

In some embodiments, the central processor 64 may be capable of 10 Mflops to implement processes such as autocorrelation and data compression. In some embodiments, the first central processor 64 may itself implement the mass storage device 60 and/or the buffer 58, and may have in such embodiments at least 500 Mbytes storage to hold up to 20 minutes of data. The first central processor 64 may be remotely configurable, e.g., by communication using the transceiver 66. In some embodiments, the central processor 64 may calculate properties of the rock formations (25 in FIG. 1) using vibration measurements from the sensor 52.

In some embodiments, the circuitry 50 may be designed to have an average power draw of at most 25 mW. In some embodiments, the power source (18 in FIG. 7) may comprise one or more devices, for example a piezoelectric element arranged to produce electrical power from the vibrations induced in the drill string (22 in FIG. 1).

Power management performed by the central processor 64 may be configured to minimize high power operations such as data transmission (i.e., operation of the transceiver 66). Provision may be provided to activate and deactivate a "sleep" mode based on measured vibration amplitude (e.g., acceleration levels) so that power consumption is minimized while borehole drilling is not underway.

The foregoing components of the circuitry 50 may be implemented in any known form whether on a single integrated circuit or multiple, individual or combination circuit components. Fully separate components as shown in FIG. 8 are only for purposes of explaining the functions that may be performed by the circuitry 50 and are not intended to limit the scope of the present disclosure. Further, the acts of the processing described above may be implemented by running one or more functional modules in information processing apparatus such as general purpose processors or application specific chips or chip sets, such as application specific integrated circuits (ASICs), floating programmable gate arrays (FPGAs), programmable logic devices (PLDs), or other suitable devices. These modules, combinations of these modules, and/or their combination with general hardware are all included within the scope of the present disclosure.

Figure 9:
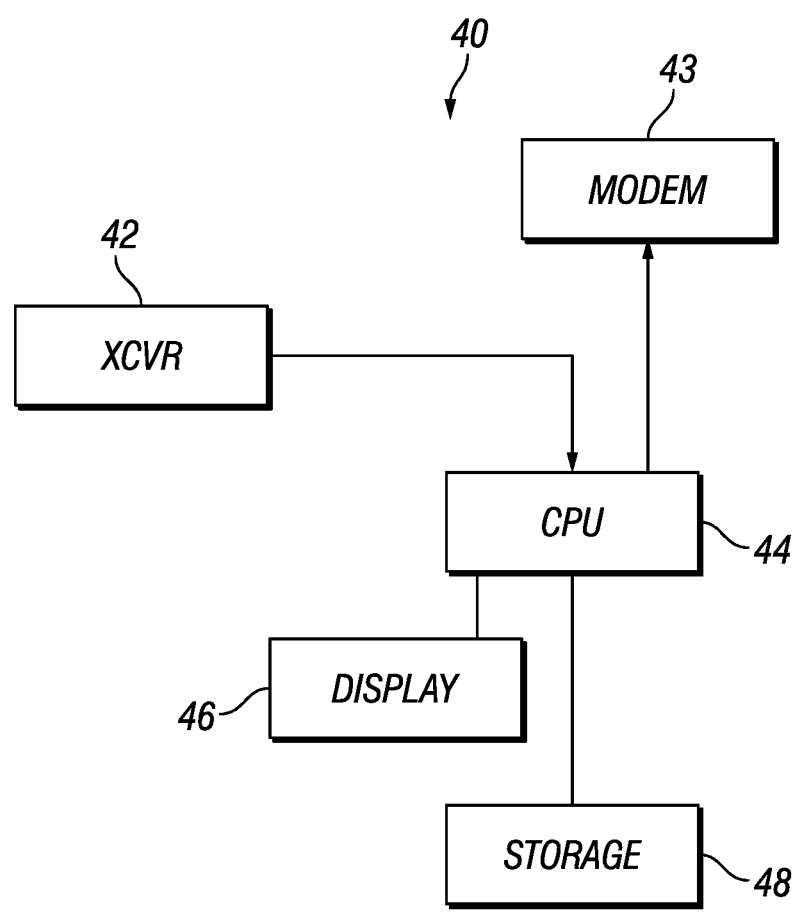
FIG. 9 shows functional components of an example embodiment of a data processing unit.

FIG. 9 shows an example embodiment of the data processing unit 40. The data processing unit 40 may comprise a receiver, implemented as a transceiver 42 capable of communication with the transmitter (implemented as the transceiver 66 in FIG. 8). The transceiver 42 may be in signal communication with a second central processor 44 forming part of the data processing unit 40. In some embodiments, the second central processor 44 may be implemented as explained with reference to the first central processor (64 in FIG. 8). The second central processor 44 may be in signal communication with a computer display 48 of any type known in the art so that a user may view processed signal output indicative of certain physical attributes of the rock formation (25 in FIG. 1) that may be determined from the vibrations detected by the sensor assembly (10 in FIG. 1). Processed and/or unprocessed signals obtained from the sensor assembly (10 in FIG. 1) may be stored on any type of mass storage device 48, which may in some embodiments be configured substantially as explained with reference to FIG. 8. The central processor 44 may manage communications between the first central processor (64 in FIG. 8) in the sensor assembly (10 in FIG. 1), and to use an LTE modem 43 to move data to an Internet-based data storage and/or processing facility. The second central processor 44 may also perform calculations such as autocorrelation and data compression and could perform data transformations and drive the display 46 to make visual representations of measurements made by the sensor assembly (10 in FIG. 1). The second central processor 44 may also function as data logger to record unprocessed measurements (e.g., in mass storage 48) as needed. The example embodiment shown in FIG. 9 may enable determining properties of the rock formations (25 in FIG. 1) using only drill string vibration-related signals detected by the sensor 52, that is, without using signals detected by any other sensor, including one or more sensors (e.g., seismic sensors) disposed proximate the ground surface (21 in FIG. 1).

In some embodiments, either or both the first central processor (64 in FIG. 8) and the second central processor (44 in FIG. 9) may have programming residing therein or able to be loaded thereon to calculate rock formation properties from the signals detected by the sensor (52 in FIG. 8).

Figure 10:
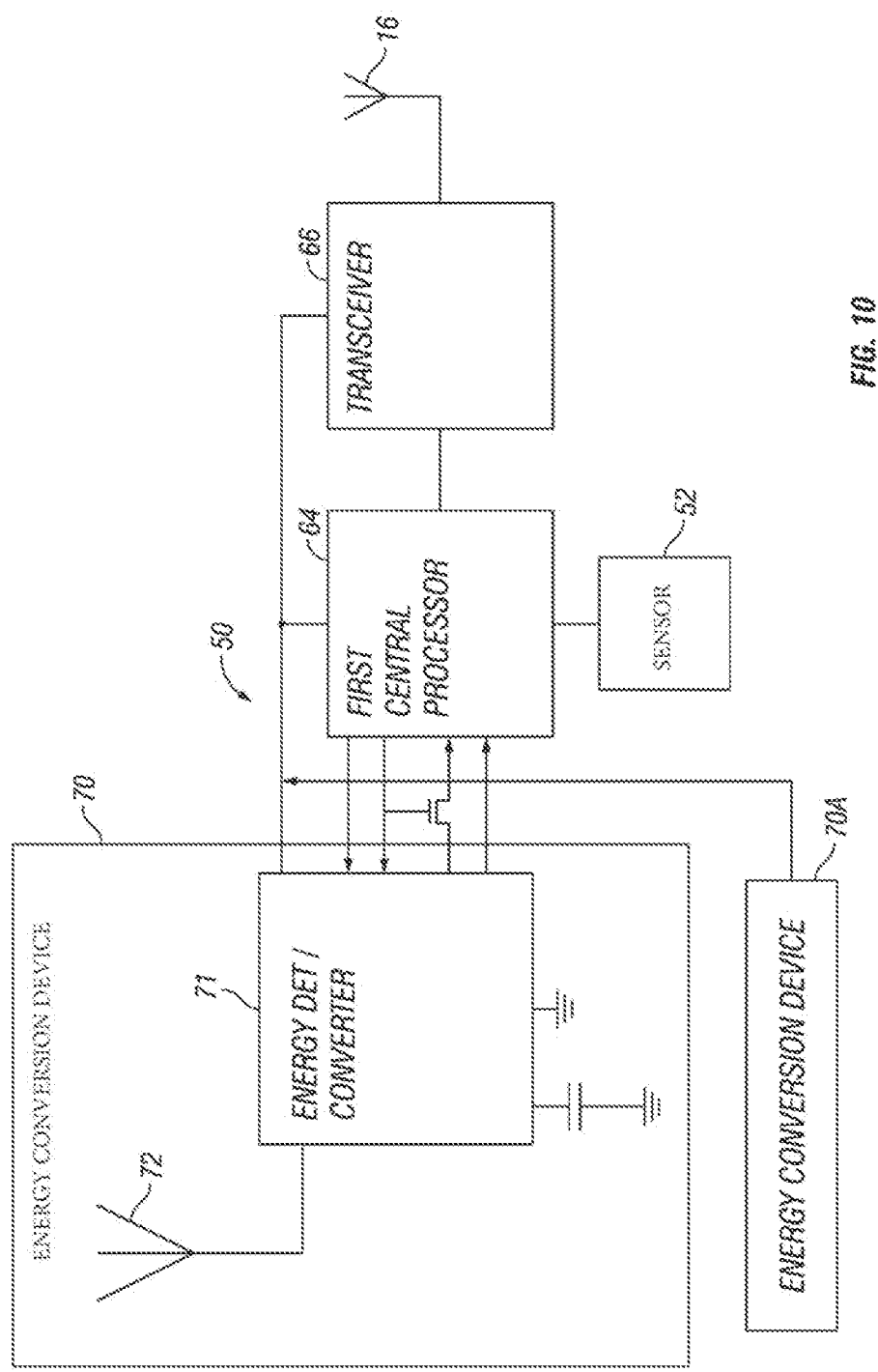
FIG. 10 shows the example embodiment of FIG. 8 including a power converting device.

In some embodiments, electrical power to operate the circuitry (50 in FIG. 8) may be supplemented or provided by an energy conversion device. The energy conversion device may be implemented as part of or in addition to the circuitry shown in FIG. 7 and FIG. 8. An example implementation of an energy conversion device is shown in FIG. 10. The energy conversion device 70 may comprise a radio frequency (RF) energy detector and converter 71, for example, one sold by Powercast, LLC, 620 Alpha Drive, Pittsburgh, Pa. 15238 as model number P2110B receiver of the POWERHARVESTER product line. POWERHARVESTER is a registered trademark of Powercast, LLC. The RF energy detector and converter 71 may have a separate antenna 72, which may be disposed in a suitable location on the exterior of the sensor assembly housing (12 in FIG. 7).

In the example embodiment shown in FIGS. 8 and 9, processed signals may be communicated from the sensor assembly circuitry (50 in FIG. 8) to the data processing unit (40 in FIG. 9), wherein the second central processor (44 in FIG. 9) in the data processing unit (40 in FIG. 9) may have instructions thereon to calculate one or more properties of the rock formations (25 in FIG. 1) from the signals generated by the sensor (52 in FIG. 1). In some embodiments, the first central processor in the sensor assembly, shown at 64 in FIG. 8 may comprise programming to enable calculating one or more properties of the rock formations. The calculated one or more properties may be stored in the mass storage device (60 in FIG. 8) and/or may be communicated to another location for storage, further communication and/or further processing, for example and without limitation, the data processing unit (40 in FIG. 9).

Other implementations of an energy conversion device may comprise vibrational energy conversion devices such as sold under designation modelA, modelD and/or modelQ by Revibe Energy, Falkenbergsgatan 3, 412 85 Gothenburg, Germany. Such energy conversion device is shown in FIG. 10 at 70A.

The methods described thus far have been successfully tested on mine drilling rigs of the following types; Rotary drills with roller tricone bits, Down the hole "DTH" pneumatic hammer drills, "RC" Reverse circulation drills, and "DDH" diamond drill bits.

However the physical shock of testing the system mounted on the drill string on a Top hammer drill proved to be challenging due to the extreme shock environment causing failure of the sensors, electronics, and batteries. To do this a vibration sensing method using only a rugged passive element attached to the drill shaft is employed.

In Some embodiments a cylindrical profile change is added on to the shank adaptor, machined such that eccentricity is minimized and the signal detected by an electromagnetic, magnetic or capacitive sensor is placed proximal to, but not connected to the drill shaft that can measure displacement, velocity, or acceleration, of the shank adaptor with frequency up to several kilohertz.

In some embodiments the cylinder is a magnetic material magnetized such that magnetic fields are aligned with poles along the axis of the drill shaft. A magnetic sensors detects the displacement, velocity or acceleration of the drill rod, via a change in magnetic flux as vibration passes along the drill shaft axis.

In some embodiments the cylinder is a material with a higher magnetic susceptibility than the rest of the shaft such that in the presence of a constant magnetic field a signal is induced in a magnetic sensor or pick up coil when there is an axial displacement of said cylindrical body. Such a device is similar to "pick up" from an electric guitar.

In some embodiments the cylinder against which one face a capacitive sensor is placed when there is an axial displacement of said cylindrical body a signal is generated.

In some embodiments the sensor is designed to maximize the sensitivity to axial vibration. and is designed to minimize or cancel the noise from rotation, and non-axial vibration.

In some embodiments the processor, sensor electronics and battery may reside on or above a "shock sub" or shock absorbing element, thus reducing the exposure to shock of the electronics, whereas the sensor itself may reside below the said shock sub, and measure with full fidelity the vibration, and be connected via a shielded cable.

Although only a few examples have been described in detail above, those skilled in the art will readily appreciate that many modifications are possible in the examples. Accordingly, all such modifications are intended to be included within the scope of this disclosure as defined in the following claims.

What is claimed is:

1. A vibration while drilling acquisition and signal processing system, comprising:
    at least one sensor assembly affixable to a rotating part of a drill string in a drilling unit, each such sensor assembly comprising at least one sensor for detecting vibrations in the drill string, wherein the affixing of the sensor assembly to the drill string is configured to provide substantially resonance free frequency response of the sensor assembly to at least 200 hertz and a signal sampling rate of the at least one sensor is at or above 1 Kilohertz;
    a first processor in signal communication with the at least one sensor and programmed to digitally sample signals from the at least one sensor;
    a transmitter in signal communication with the first processor to communicate digitized signals to a device disposed apart from the drill string, the first processor programmed to operate the transmitter;
    an electric power source to provide power to the sensor, the first processor and the transmitter; and
    wherein at least one of the first processor and a second processor associated with the device is programmed to calculate properties of rock formations using only detected vibration signals from the drill string.

2. The system of claim 1 wherein the first processor is programmed to compress the digitized signals.

3. The system of claim 1 wherein the first processor is programmed to perform autocorrelation to compress the digitized signals.

4. The system of claim 1 wherein the first processor is programmed to operate the transmitter intermittently during operation of the sensor assembly.

5. The system of claim 1 wherein the sensor assembly is disposed in a housing affixed to the drill string using at least one permanent magnet.

6. The system of claim 1 wherein the at least one sensor comprises one or more of an accelerometer, a multi-axial accelerometer and a microelectrical mechanical accelerometer.

7. The system of claim 1 wherein the electric power source comprises a battery.

8. The system of claim 1 further comprising an energy conversion device electrically connected to the electric power source, the energy conversion unit converting at least one of vibrational energy and electromagnetic energy to electrical power.

9. The system of claim 1 wherein the properties comprise compressional modulus or compressional velocity.

10. The system of claim 1 further comprising a data storage device in signal communication with the first processor to store the digitized signals in the sensor assembly during drilling and for later interrogation and processing.

11. The system of claim 1 further comprising an acoustic reflector in the drill string.

12. A method for acquiring drill string vibration data during drilling, comprising:
    detecting vibrations along a rotating part of a drill string while drilling a borehole;
    digitizing signals corresponding to the detected vibrations in a device mounted to the drill string wherein the detecting is performed by a sensor assembly, comprising at least one sensor, mounted to the to the drill string to provide substantially resonance free frequency response of the sensor assembly to at least 200 hertz and the digitizing is performed at a signal sampling rate of the at least one sensor at or above 1 Kilohertz;
    transmitting the digitized signals to a location apart from the drill string; and
    calculating properties of rock formations at least one of,
        (i) at the location using only the digitized signals, and
        (ii) in the device mounted on the drill string using only the digitized signals.

13. The method of claim 12 further comprising storing the digitized signals in the device mounted on the drill string and subsequently interrogating and processing the stored, digitized signals.

14. The method of claim 12 wherein the properties comprise compressional modulus.

15. The method of claim 12 further comprising compressing the digitized signals.

16. The method of claim 15 further comprising operating a transmitter to produce the transmitted digitized signals intermittently and transmitting the compressed, digitized signals using the intermittently operated transmitter.

17. The method of claim 16 wherein the transmitting is performed intermittently when drilling has stopped.

18. The method of claim 12 further comprising converting vibrations in the drill string into electrical power to enable the digitizing and transmitting.

19. A vibration while drilling acquisition and signal processing system, comprising:
    at least one sensor assembly affixable to a rotating part of a drill string in a drilling unit, the at least one sensor assembly comprising at least one sensor for detecting vibrations in the drill string, wherein the sensor assembly is affixed to the drill string to provide substantially resonance free frequency response of the sensor assembly to at least 200 hertz and a sampling rate of the at least one sensor is at or above 1 Kilohertz;
    a transmitter in signal communication with the at least one sensor to communicate vibration signals to a device disposed apart from the drill string,
    an electric power source to provide power to the at least one sensor and the transmitter; and
    a receiver, and a processor at a location for receiving signals from the device, wherein the processor is programmed to calculate properties of rock formations only detected vibration signals from the drill string.

20. The system of claim 19 wherein the at least one sensor comprises a piezoelectric or piezo resistive sensor.

21. The system of claim 19 wherein the electric power source comprises a battery.

22. The system of claim 19 further comprising an energy conversion device electrically connected to the electric power source, the energy conversion unit converting at least one of vibrational energy and radio frequency energy to electrical power.

23. The system of claim 19 wherein the properties include compressional modulus.

24. The system of claim 19 further comprising an acoustic reflector in the drill string.

25. A vibration while drilling acquisition and signal processing system, comprising:
- at least one sensor assembly adjacent to a rotating part of a drill string in a drilling unit, each such sensor assembly comprising at least one sensor for remotely sensing vibrations in the drill string, wherein affixing of the at least one sensor assembly to the drill string is configured to provide substantially resonance free frequency response of the sensor assembly to at least 200 hertz and a signal sampling rate of the at least one sensor is at or above 1 Kilohertz;
- a first processor in signal communication with the at least one sensor and programmed to digitally sample signals from the at least one sensor;
- wherein at least one of the first processor and a second processor is programmed to calculate properties of rock formations using only detected vibration signals from the drill string.

26. The system of claim 25 wherein the sensor senses magnetic field to measure axial displacement or velocity.

27. The system of claim 25 wherein the sensor utilizes electromagnetic induction to measure axial displacement or velocity.

28. The system of claim 25 wherein the sensor utilizes a capacitive measurement of axial displacement or velocity.

29. The system of claim 25 further comprising an acoustic reflector in the drill string.

* * * * *